United States Patent [19]
Leijten et al.

[11] Patent Number: 6,049,818
[45] Date of Patent: Apr. 11, 2000

[54] SIGNAL PROCESSING DEVICE

[75] Inventors: Jeroen A. J. Leijten; Jozef L. Van Meerbergen; Adwin H. Timmer, all of Eindhoven, Netherlands

[73] Assignee: U.S. Philips Corporation, New York, N.Y.

[21] Appl. No.: 08/963,932

[22] Filed: Nov. 4, 1997

[30] Foreign Application Priority Data

Nov. 4, 1996 [EP] European Pat. Off. .............. 96203069

[51] Int. Cl.$^7$ ................................ G06F 9/40; G06F 9/46
[52] U.S. Cl. .................... 709/107; 709/108; 709/102; 712/219; 712/28; 710/20; 710/268
[58] Field of Search ..................................... 370/450, 392, 370/474; 712/27, 28, 201, 245, 219; 710/68, 63, 129, 20, 268, 263, 260; 345/506, 326, 340, 348; 382/232; 709/221, 300, 245, 107, 108, 102

[56] References Cited

U.S. PATENT DOCUMENTS

| | | | |
|---|---|---|---|
| 4,354,225 | 10/1982 | Frieder et al. | 364/200 |
| 5,465,368 | 11/1995 | Davidson et al. | 712/27 |
| 5,603,012 | 2/1997 | Sotheran | 370/450 |

OTHER PUBLICATIONS

"Data Flow Processor for Multi–standard Video Codec", by Bank W. Lee et al, IEEE 1994 Custom Integrated Circuits Conference (CICC; San Diego, May 1994) pp. 103–106.

IEEE 1994 Custom Integrated Circuits Conference (CICC; San Diego, May 1994) pp. 103–106; "Data Flow Processor for Multi–Standard Video Codec", Bang W. Lee, Hyuk S. Kwon, Bong N. Kim, David Still, Tom Koper, Surendar Magar.

*Primary Examiner*—Daniel H. Pan

[57] ABSTRACT

Distributed digital signal processing is executed by a number of processing elements. Signal processing processes are scheduled for individual processing elements according to the data flow principle. To this end, the flow of signal samples is subdivided into data tokens, each of which has several samples. A process is started in a processing element in response to the detection of a data token presented so as to undergo the process. The detection is processed by a control unit which, in response thereto, allocates a communication connection between a first processing element producing the relevant data token and a second processing element which is to process the data items present in the data token. Scheduling is thus achieved by allocation of the communication connection. Furthermore, in order to avoid deadlock problems, restrictions are imposed as regards the execution sequence of processes.

20 Claims, 4 Drawing Sheets

| | | | |
|---|---|---|---|
| E0 | A | 10a | E0 |
| E1 | B | 10a | E1 |
| E2 | C | 10c | E2 |
| E3 | D | 10d | E3 |
| E4 | P | 10b-x | E5 |
| E5 | P | 10b-y | E8 |
| E6 | Q | 10b-y | E4 |
| E7 | E | 10e | E7 |
| E8 | Q | 10b-x | E6 |
| E9 | – | | E9 |

SIGNAL PROCESSING DEVICE

BACKGROUND OF THE INVENTION

The invention relates to a signal processing device for the execution of processes, a first process of which produces a data token with a process identification and a plurality of data items whereas a second process processes the data items of the first process, which signal processing device includes:

- a first processing element which executes the first process and successively produces the data items, and
- a second processing element which, in response to the reception of the data token, processes the plurality of data items according to the second process under the control of the process identification.

A signal processing device of this kind is known from an article by Bang W. Lee et al. in Proceedings of the IEEE 1994 Custom Integrated Circuits Conference (CICC; San Diego, May 1994) pp. 103–106: "Data Flow Processor for Multi-standard Video Codec".

Notably video signal processing requires processing speeds which, given the IC technique at present, can be achieved only by parallel processing in a number of processing elements. The scheduling of the parallel processing conventionally utilizes a control flow architecture with centrally coordinated program control in which the scheduling of the various parallel processes performed on data items is defined.

The article by Bang W. Lee proposes to schedule the parallel processes according to a data flow principle. According to the data flow principle, use is made of units of data, referred to as data tokens, which are processed according to various processes. Each data token contains not only conventional data items, but also a process identification wherefrom the process to be performed on the data items can be deduced. The processor starts the process in response to the availability of the data token to be processed, the process being chosen on the basis of the process identification, without a centrally coordinated program control determining in advance which process is to be stared at which instant.

SUMMARY OF THE INVENTION

It is inter alia an object of the invention to provide a signal processing device of the kind set forth in which the processing efficiency is further enhanced.

To achieve this, the signal processing device according to the invention is characterized in that the second processing element is arranged to start the processing of the data items in response to the start of reception of the data token, irrespective of whether or not the first processing element has already produced the data items of the data token. The signal processing device thus operates as a pipeline in which successive processes are performed in parallel on a flow of data items or on segments thereof. A data token represents a part of a flow containing a plurality of data items, each of which is in principle processed identically during a process, for example samples of a time- continuous or space-continuous signal. Thus, a plurality of segments of a flow can alternately arrive at a processing element, each segment being of limited length, and the beginning of a process on a flow segment is scheduled once according to the data flow principle for the entire flow segment, using the process identification. This approach deviates from the data flow principle in that it no longer treats a process for processing a data token as being indivisible.

An embodiment of the signal processing device according to the invention, in which the first and the second processing element form part of a system of at least three processing elements and which includes an allocatable communication connection between processing elements of the system, is characterized in that the signal processing device includes an allocation controller provided with information concerning mapping of the processes on the system of processing elements, which allocation controller allocates, in response to a start of production of the data token and under the control of the information on the mapping concerning the process identification in the data token, the communication connection for transmission of the data token from the first processing element to an input of the second processing element if the communication connection has not been allocated for the transmission of another data token to said input of the second processing element. The allocation controller thus actually provides the scheduling. If the allocation controller conducts the data token with the process identification to the second processing element, the second processing element will start to execute the second process in response thereto.

Another embodiment of the signal processing device according to the invention is characterized in that the first processing element is provided with a processing unit and an output FIFO (First-In First-Out) between the processing unit and the communication connection, the processing unit executing the first process, producing the data items and successively writing these items in the output FIFO, the data items being successively read from the output FIFO for transmission via the communication connection if the allocation controller has allocated the communication connection for transmission of the data token. The first processing element can thus continue the production of data items even if the allocation controller has not yet allocated the communication connection for transmission of the data token, for example because the second processing element is still engaged in the processing of a previous data token or because the production of a further data token, which is to be processed in combination with the second data token in the second process, has not yet started.

A further embodiment of the signal processing device according to the invention is characterieed in that the second processing element is provided with a processing unit and an input FIFO between the processing unit and the input of the processing element, the data items being successively written from the first processing element, via the communication connection, into the input FIFO and the processing unit successively reading the data items from the FIFO for processing according to the second process, the allocation controller being arranged to allocate the communication connection to the second processing element for the transmission of the data token in response to the detection that a last data item of a preceding data token has been written into the input FIFO. The processing unit thus processes data tokens in the sequence of their arrival and hence need not be specifically designed for data flow processing. Thus, the transmission of the data token can commence already before the previous data token has been completely processed.

Processing according to the data flow principle involves the risk of deadlock. Deadlock arises, for example when processing stops due to an excessive number of data tokens produced for different processes, without data tokens being available for all inputs for any process. This is a problem notably in a signal processing device comprising function-specific processing elements, each of which is very efficiently constructed for the execution of processes having a specific function (DCT, filtering etc.) but is not capable of executing other processes. Consequently, deadlock cannot be prevented by changing the choice for allocation of processes to processing elements.

Another problem arising due to the allocation of a plurality of processes to the same processing elements is called "starvation". A process affected by starvation will rarely be executed, because data tokens of other processes arriving at a processing element far outnumber those of the relevant process.

An embodiment of the signal processing device according to the invention is characterized in that the signal processing device includes sequence programming means for programming a process sequence of a number of programmably selected processes;

sequencing means for imposing a restriction as regards a transmission sequence in which the processes transmit data tokens via the communication connection in conformity with the process sequence of processes programmed in the sequence programming means. Thus, during the programming of the signal processing device the programmer or the compiler can take steps in order to prevent deadlock and starvation, for example by specifying that the processes supplying inputs for different processes allocated to one and the same processing elements are alternately started.

A further embodiment of the signal processing device according to the invention is characterized in that the sequence programming means are coupled to the allocation controller in order to block the allocation of the connection for the transmission of the data token for as long as the second process is not yet due in conformity with the process sequence. The communication arbitration, already being necessary anyway, is thus used to impose the restrictions on the sequence.

The second processing element in a further embodiment of the signal processing device according to the invention has a further input, the second process being mapped on the second processing element, together with a third process, the second process receiving data from the first process and a fourth process via the input and the further input, respectively, the second process receiving data from a fifth and a sixth process via the input and the further input, respectively, the sequence programming means being programmed so that a sequence in which data tokens of the first and the fifth process are transmitted, via the communication connection, to the first and the second process, respectively, corresponds to a sequence in which data of the fourth and the sixth process are transmitted, via the communication connection, to the first and the second process, respectively. The deadlock situation which arises if processing elements produce different data tokens for one of the inputs, and hence do not start the production of any associated data token for the other input, is thus prevented.

A further embodiment of the signal processing device according to the invention is characterized in that the second processing element has a further input which is connected to the communication connection in order to receive a further data token, the second process processing data items from the data token and the further data token in combination, the allocation controller allocating the communication connection for the transmission of the data token only if a start of the production of the data token as well as a start of the production of the further data token has been detected by the allocation controller. The allocation controller thus provides the so called matching of data tokens, which means that the data tokens which arrive at the second processing element in paired fashion are intended for the same second process. The second processing element can thus process the incoming data tokens without further matching.

BRIEF DESCRIPTION OF THE DRAWINGS

These and other advantageous aspects of the signal processing device according to the invention will be described in detail hereinafter with reference to some Figures.

DESCRIPTION OF THE PREFERRED EMBODIMENTS

Figure 1:
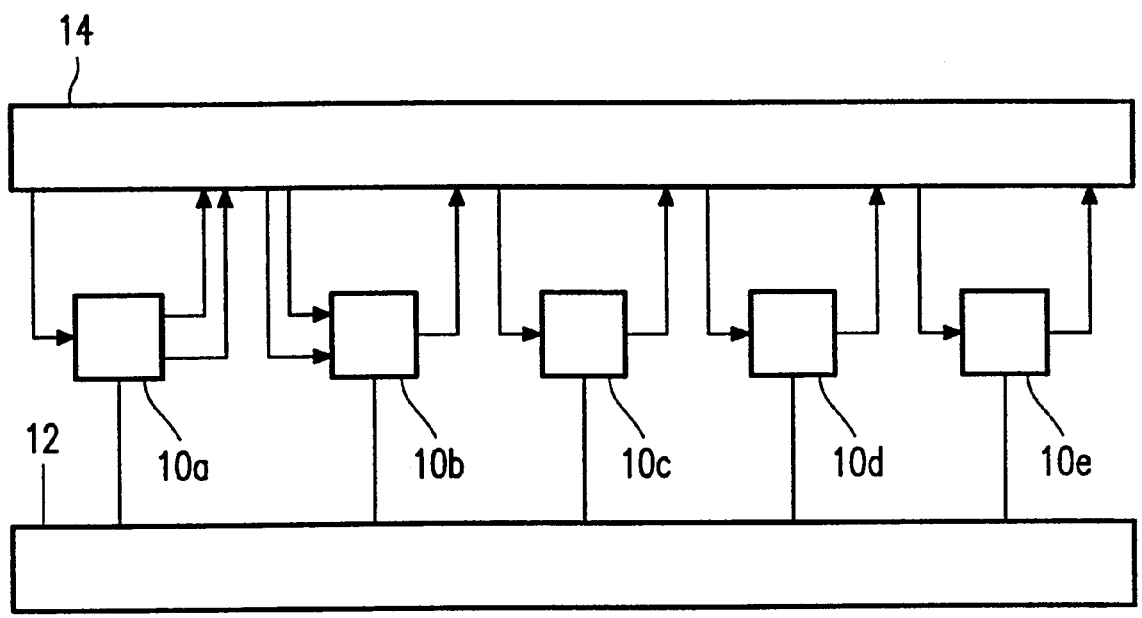
FIG. 1 shows a signal processing device.

FIG. 1 shows a signal processing device. It includes, by way of example, five processing elements $10a$–$e$, a programmable control unit 12 and a crossbar switch 14. The processing elements $10a$–$e$ can be connected to one another via the crossbar switch 14. The crossbar switch 14 is controlled by the control unit 12.

Figure 2:
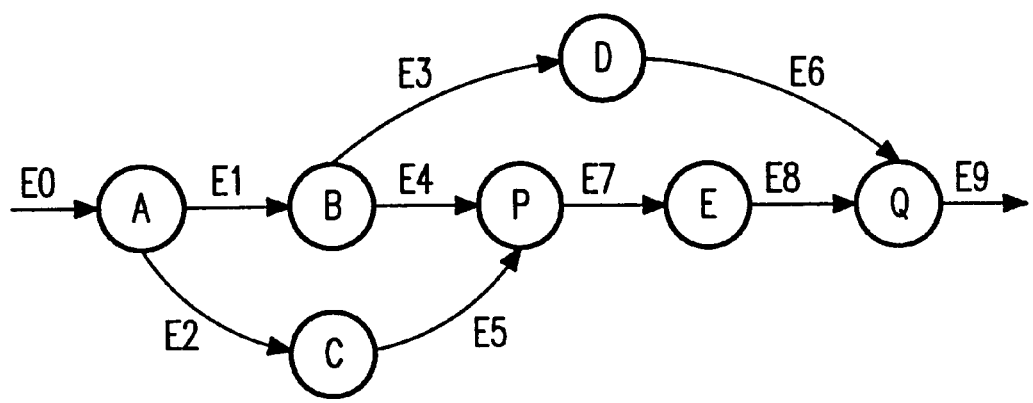
FIG. 2 shows an example of a data flow graph.

FIG. 2 shows an example of a data flow graph 20. The data flow graph 20 represents a composite data processing process which is composed of processes (A,B,C,D,E,P,Q). Each process (A,B,C,D,E,P,Q) corresponds to a given data processing function. The function of the process A could be, for example Fourier transformation whereas the processes B and C could be the quantization of the real and the imaginary component of the Fourier transform; another process could perform a Huffman decoding or a run length decoding operation, etc. Different processes may have the same function which is executed on different data.

Each process in the data flow graph 20 is symbolized by a respective node (A,B,C,D,E,P,Q). Edges E0–E9 in the data flow graph symbolize a data exchange between the processes (A,B,C,D,E,P,Q). According to the data flow graph 20, the data enters a process A via an edge E0. The process A produces two types of output data which are applied to the processes B and C via edges E1, E2, respectively. The process B in its turn produces two types of output data which are applied to the processes D and P via edges E3 and E4, respectively. The process C produces one type of output data which is applied to the process P via edge E5. The process P receives two types of input data and produces one type of output data which is applied to the process E via edge E7. The process D produces output data which is applied to the process Q via edge E6 and the process E produces output data which is applied to the process Q via edge E8. The process Q outputs the final result of the composite data processing operation via edge E9.

During operation the signal processor of FIG. 1 executes the data flow graph 20, for example on each of a series of image signals. To this end, the various processes (A,B,C,D,E,P,Q) are mapped onto the system of processing elements $10a$–$e$. For example, the processes A and B are mapped onto the processing element $10a$, the processes P and Q onto the processing element $10b$ and the processes C, D, E onto the processing elements $10c$–$e$, respectively. Thus, several processes can be mapped onto the same processing element. Other than in the present example, there could also be processing elements on which no process is mapped.

The incoming image signal is applied to the processing element $10a$ on which the process A is mapped. The processing element 10*a* executes the function of the process A for each image and produces for each image the two types of data objects which follow from the process A. These two types of data objects are transmitted, each time via the crossbar switch 14, to the processing elements 10*a*, 10*c* on which the processes B, C are mapped which receive the results of the process A in conformity with the data flow graph 20. The data objects in their turn are processed in the processing elements 10*a*, 10*c*.

Figure 3:
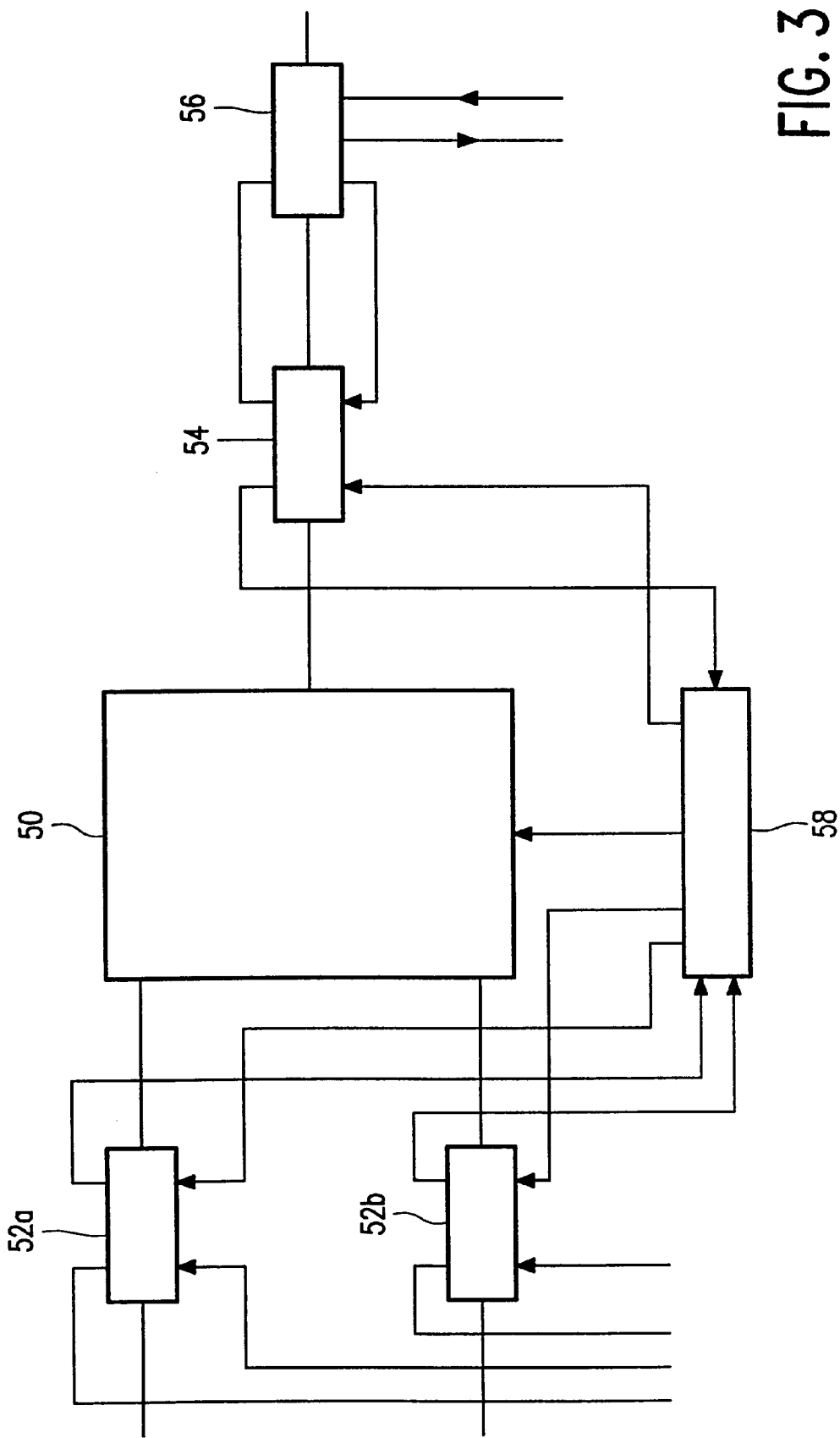
FIG. 3 shows a processing element.

FIG. 3 shows an embodiment of a processing element. The processing element includes a processing unit 50 with two inputs which are connected to the inputs of the processing element via respective FIFOs 52*a,b*. Furthermore, an output of the processing unit 50 is coupled to an input of a router 56 via a FIFO 54. The processing element also includes an execution control unit 58. Each of the FIFOs 52*a,b*, 54 has an input-clock input, an output-clock input, a FIFO full/not-full output, and a FIFO empty/not-empty output. The output-clock input of the FIFOs 52*a,b* at the input of the processing unit 50 is coupled to the execution control unit 58, together with the FIFO empty/not-empty output of these FIFOs. The input-clock input and the full/not-full output of the FIFO 54 at the output of the processing unit 50 are also coupled to the execution control unit 58.

The input-clock input and the FIFO full/not-full output of the FIFOs 52*a,b* at the input are coupled to the control unit 12. The output-clock input and the FIFO empty/not-empty output of the FIFO 54 are coupled to the router 56. The router is connected to the control unit 12 (not shown).

Respective data tokens are applied to the inputs of the input FIFOs 52*a,b* during operation. A data token contains, for example a number of data items which together represent an image and are successively written into an input FIFO 52*a,b*. A data token also contains, for example a length code which indicates the number of data items in the data token, an indication of the function according to which the image signal is to be processed, and an identification of the edge whereto the output data of this function correspond in the data flow graph.

The execution control unit 58 controls the activation of the processing unit 50, for example when the FIFOs 52*a,b* apply a non-empty signal to the input and the FIFO 54 applies a non-full signal to the output. When the processing unit 50 is activated, it reads the length code and the indication of the function to be performed on the incoming data from the FIFOs 52*a,b*. Subsequently, the processing unit 50 reads the data items successively from the input FIFOs 52*a,b*. The data items are processed in conformity with the indication of the function, for example by execution of a Fourier transformation or by execution of variable length decoding. Processing may commence as soon as the indication of the function and a first data item are available in the input FIFOs 52*a,b*. The starting of the operation need not be postponed until all data items have become available. Generally speaking, the input FIFOs 52*a,b* will even be too short to accommodate all data items in a data token at the same time.

The processing operation produces a series of output data items. The processing unit 50 successively applies these data items to the output FIFO 54, preceded by the identification of the edge whereto the output data of this function corresponds. Depending on the function, the supply of data items to the output FIFO 54 may already commence before all data items have arrived at the input.

On the basis of the empty/not-empty signal from the FIFO 54 on the output of the processing unit 50, the router 56 detects whether output data is available. If this is the case and the availability has not yet been signaled to the control unit 12, the availability is signaled to the control unit 12, together with the identification of the edge in the data flow graph whereto the output data corresponds. In response thereto the control unit indicates the function of the operation to be performed on the output data and the identification of the edge resulting from the operation to the router 56. Furthermore, via the crossbar switch 14, the control unit 12 allocates a connection to the processing element which is to execute the relevant operation.

After the control unit 12 has signaled the router 56 that the communication connection is available, the router 56 dispatches the indication of the function and the identification of the edge via the crossbar switch 14 (not shown). When the process executed by the processing element produces output data over more than one edge, these edges are preferably consecutively numbered. In that case the control unit 12 need apply only the lowest number to the router 56 or the processing unit; the router 56 or the processing unit can then itself generate the numbers of the successive output edges.

The router 56 subsequently applies clock signals to the output-clock input of the output FIFO 54, so that the data items are successively dispatched from the output FIFO 54, via the crossbar switch 14 (not shown). It is ensured that the dispatch is interrupted if the FIFO 54 with output data is empty or if the FIFO 52*a,b* whereto this output data is applied is full. This is controlled, for example by the control unit 12 or by exchanging the empty/not-empty and full/not-full signals, via the crossbar switch 14, between the relevant processing elements 10*a–b*.

The control unit 12 contains a representation of the data flow graph and is programmable so that different data flow graphs can be represented therein. The control unit 12 controls the processing elements 10*a–e* and the crossbar switch 14 in such a manner that the programmed data flow graph is indeed executed.

Figures 4, 5:
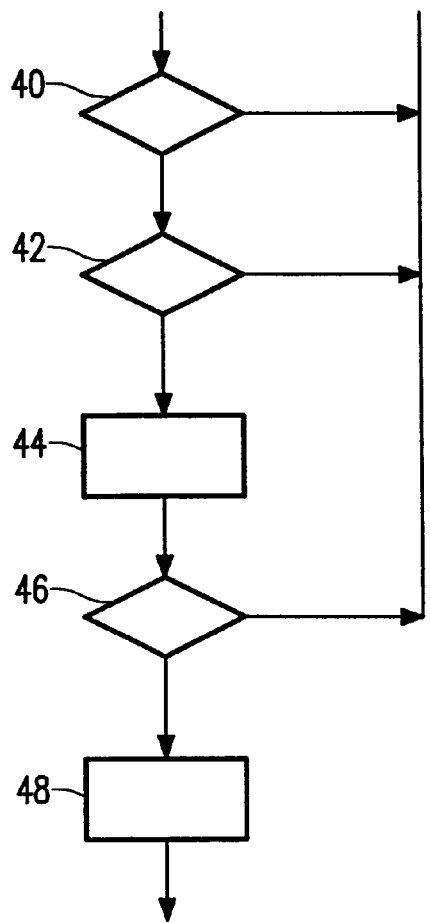
FIG. 4 shows a table for a controller.
FIG. 5 shows a flow chart for a controller

FIG. 4 shows a representation in the form of a table of a data flow graph for use by the control unit 12. For each edge of the data flow graph the table contains a separate row. Each row contains, by way of example:

an identification of the relevant edge,
  an identification of the function of the operation to be performed on the data transferred via the relevant edge,
  an identification of the processing element which is to execute this function and, if necessary, of the input of the processing element via which the data is to be supplied,
  an identification of a further edge via which data transport may be permitted after the transport of data via the relevant edge.

FIG. 5 shows a flow chart of an example of how this table is used by the control unit 12. The flow chart is based on the assumption that a processing element 10*a–e* signals the control unit 12 that output data of a process is available for transport and that the processing element 10*a–e* signals the edge in the data flow graph with which this data corresponds.

The control unit 12 repeatedly executes the flow chart for each of the processing elements 10*a–e*, for example on a round-robin basis. During a first step 40 of the flow chart, the control unit 12 tests whether a signal has been received from a relevant first processing element 10*a–e*. If not, the execution of the flow chart stops. If so, the controller 12 tests in a second step 42 whether data transport corresponding to the edge signalled by the relevant processing element 10*a–e* is enabled. The objective thereof, and the way in which it is performed, will be described in detail hereinafter; for the discussion of the flow chart it suffices that the control unit 12 terminates the execution of the flow chart if the edge has not been enabled and that it executes a third step 44 if the data transport has been enabled. During the third step 44 the control unit 12 determines, on the basis of the signaled edge and the table, which of the processing elements 10a–e is to process the available data and to which input of this (second) processing element 10a–e this data must be applied. During the subsequent fourth step 46 the control unit 12 tests whether this input has already been reserved for the supply of other data. If so, the execution of the flow chart is terminated; if not, the control unit 12 reserves the input and executes a fifth step 48.

During the fifth step 48 the control unit 12 controls the crossbar switch 14 in such a manner that it establishes a connection between an output of the first processing element 10a–e, having signaled that output data is available, and the input of the second processing element 10a–e which is to process this data. The control unit 12 disables the signaled edge for other output, for example by appropriately loading a memory element which indicates the enabled/disabled states of the edge. The control unit 12 subsequently determines, on the basis of the signaled edge and the table, which further edge must be enabled. The control unit 12 enables this edge, for example by loading the relevant memory element accordingly. As appears from the table, the originally signaled edge can then be directly enabled again, so that the signaled edge is actually permanently enabled.

The control unit 12 determines the function which is to be executed on the output data from the table on the basis of the signaled edge, and applies an indication of this function to the first processing element 10a–e. Furthermore, the control unit determines an identification of the output edge of lowest number of the process executing this function and applies it to the first processing element 10a–e. Therefore, for each edge row the control unit 12 preferably contains, in addition to the information concerning the function of the process whereto this edge applies data, information (not shown) concerning the lowest numbered edge transmitting output data of the relevant process. This information, however, can also be found by using process identification information and a table containing process identification/output edge relations.

The operation of the signal processing device according to the invention will be described in detail hereinafter on the basis of an example of a simplified data flow graph.

Figure 6:
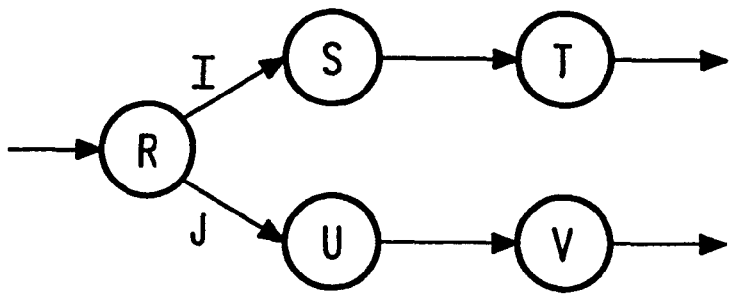
FIG. 6 shows an example of a data flow graph.

FIG. 6 shows an example of a data flow graph. This data flow graph comprises five processes R, S, T, U, V. A first process R has two outputgoing edges I, J which extend to a first process S and a second, consecutive process U, respectively. The consecutive processes S, U each have one outgoing edge which extends to respective further consecutive processes T, V.

Figure 7:
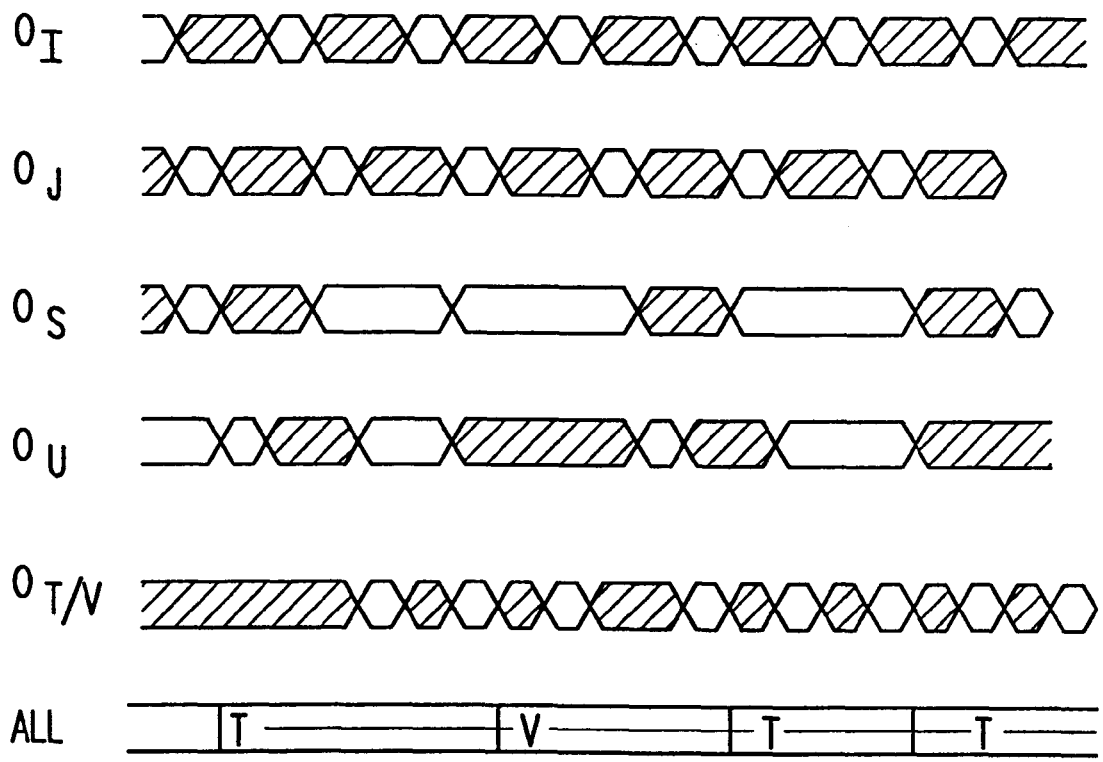
FIG. 7 shows an example of scheduling.

FIG. 7 shows a strongly simplified example of the scheduling of the execution of the processes of the data flow graph of FIG. 6. The example is based on the assumption that each of the processes R, S and U of FIG. 6 is executed by a respective processing element and that the processes T and V are executed by the same processing element. FIG. 7 contains a number of traces $O_I$, $O_J$, $O_S$, $O_U$, $O_{T/V}$ which represent the production of data items in the processing elements. FIG. 7 also contains a trace All which indicates which connection has been allocated via the crossbar switch. The first two traces $O_I$, $O_J$ represent the production of data items in the processing element executing the first process R. The third and the fourth trace, $O_S$, $O_U$, represent the production of data items in the processing elements executing the first and the second consecutive process, S, U, respectively. The fifth trace $O_{T/V}$ represents the production of data items on the output of the processing element executing the further consecutive processes T, V.

The example of FIG. 7 shows that in response to successive data items arriving via the incoming edge I, the process S produces varying numbers of output data items in dependence on the contents of the data items, so 1, 3, 4, 0, 4, 0, 1, respectively in the present example. This is the case, for example for a variable length decoder as used for MPEG decoding. The data items produced are combined so as to form data tokens. The process S itself determines the number of data items combined so as to form one data token. The process S combines, for example every foursome of produced data items into a data token. The process U operates similarly, but produces 1, 2, 0, 1, 3, 0, data items, respectively, in response to the successive data items in the present example.

As soon as the process S commences the production of data items, the control unit 12 allocates, via the crossbar switch 14, a connection from the processing element executing the process S to the processing element executing the process T. For every two data items received, the process T produces one output data item. While the process T is being executed, the process U also starts to produce data items. This is signaled to the control unit, but does not lead directly to allocation, because the processing element for executing the process V on these data items and the connection to this processing element are still allocated to the process T. For as long as the connection has not yet been allocated, the data items produced are buffered in the output FIFO of the processing element executing the process U. Thus, if desired, this processing element can start a next process already before the data items produced have been dispatched.

The connection to the processing element intended to execute the process V is allocated to the output of the process U for supply to the process V only after a complete data token (four data items) of the process S has arrived at the processing element executing the process T. In response thereto, the data items are read from the output FIFO of the processing element executing the process U and applied to the processing element executing the process V. This processing element starts to execute the process V in response thereto. In the further course of the traces this processing element alternately executes the process T or the process V, depending on the availability of a beginning of a data token. Thus, this processing element is allocated to the process T, for example, twice in succession if no data token from the process V is available. The process executed by this processing element at a given instant, therefore, is not predetermined but dependent on the content of the data items (for example, in the variable length decoder). The processing element can thus be used more efficiently than in the case of a predetermined schedule.

In the present example the processing element executing the processes T and V processes the data items as soon as the necessary data items arrive. If the processes T and V had another input, this processing element might have had to postpone the execution of the data items until corresponding data items were available on the other input. The transmission of data items via the crossbar switch 14, however, can continue as usual during waiting, because the relevant data items are stored in the input FIFO. Thus, the crossbar switch becomes free sooner for the transmission of other data tokens.

In principle in a process itself it is determined how many data items are combined so as to form a data token. The choice of this number is a compromise. Data tokens comprising few data items only are advantageous in a given respect because the flexibility of the scheduling is then higher (for as long as a data token continues, the connection to a processing element cannot be allocated again, even if no new data items are available yet within the data token). On the other hand, data tokens comprising many data items are advantageous in another respect, because they require less transmission overhead and burden the control unit less with, inter alia arbitration. Furthermore, a minimum number of data items may be required in a data token because of the fact that data items have to be processed together. The choice of the number of data items combined so as to form a data token leads to an adjustable, mean efficiency in a signal processing application such as video decoding, be it subject to given secondary conditions such as the secondary condition of timely response. Therefore, the number of data items to be combined so as to form a data token is preferably chosen so as to optimize the efficiency, given the processes to be executed together.

In the case of given types of tasks and in given circumstances, notably if no special matching units are used, a processing device operating according to the data flow principle can enter a deadlock situation. This can be illustrated on the basis of the data flow graph of FIG. 2. Assume that the processes P and Q are executed by the same processing element. Both processes have two inputs. Presence of corresponding data tokens, intended for the same process P or Q, on the inputs of this processing element leads to the execution of the relevant process. However, if data tokens for different processes are available on the various inputs in the input FIFO, deadlock occurs: not one process can be executed.

In order to avoid such deadlock situations, the control unit 12 comprises a mechanism which ensures that selected processes are allocated connections for transmission of data tokens only in a predetermined sequence. This enables the programmer to impose, for example in the case of the data flow graph of FIG. 2, that the processes B, C, E and D are cyclically allocated connections in this sequence (the other processes may be allocated connections independently of these processes). The programmer can thus ensure that the data tokens on the various inputs of the processing element executing the processes P and Q arrive in a sequence intended for the same process P or Q. Initially, for example a connection may be allocated only to the process B or C. Thus, the described deadlock cannot occur. Evidently, this can be achieved by way of other programs, for example by specifying that C and D are alternately allocated a connection, like B and E (assuming that C and D apply data tokens to the same inputs of the processing element executing the processes P and Q). Initially, for example, only B and C may then be allocated a connection.

The mechanism which ensures that selected processes are allocated connections only in a preprogrammed sequence is implemented in the device of FIG. 1, by way of example, by means of the table of FIG. 4 which indicates which further edge in the data flow graph must be enabled after activation of a given edge. In the table it can be programmed, for example that after the edge E4 (output of B) the edge E5 (output of C) is enabled as the further edge. For the edge E5 it can be programmed that E8 must be enabled as the further edge. For the edge E8 it can be programmed that E6 must be enabled as the further edge and for E6 it can be programmed that E4 must be enabled as the further edge. The other edges may remain permanently enabled. Via an associated initial setting of the enabling, the programmer thus ensures that deadlock cannot occur.

Another approach to avoiding deadlock problems is the use of a processing element having a memory function. Like all other processing elements, such a processing element can receive and dispatch data tokens, via the crossbar switch 12, when the relevant connections have been allocated by the control unit 14. The memory processing element comprises a memory capable of storing a number of data items for delivery at a later stage.

The memory-type processing element is capable, for example of performing a matching function: it stores data tokens intended for a given process with more than one input until a data token is available for all inputs. In response to such availability, the relevant data tokens are applied to the processing element intended to execute the relevant process. Moreover, the memory-type processing element may serve to multiply a data token by dispatching copies of a data token received. This is useful, for example if a plurality of processes are to process the same data items.

What is claimed is:

1. A signal processing device for execution of processes, a first process of which produces a data token with a process identification and a plurality of data items whereas a second process processes the data items of the first process, which signal processing device comprises:

a first processing element which executes the first process and successively produces the data items and the data token with the process identification, and a second processing element which, in response to reception of the data token, processes the plurality of data items according to the second process under control of the process identification, wherein the second processing element is arranged to start the processing of the data items in response to the start of reception of the data token, irrespective of whether or not the first processing element has already produced the data items.

2. A signal processing device for execution of processes, a first process of which produces a data token with a process identification and a plurality of data items whereas a second process processes the data items of the first process, which signal processing device comprises:

a first processing element which executes the first process and successively produces the data items, and a second processing element which, in response to reception of the data token, processes the plurality of data items according to the second process under control of the process identification, wherein the second processing element is arranged to start the processing of the data items in response to the start of reception of the data token, irrespective of whether or not the first processing element has already produced the data items, the first and the second processing elements form part of a system of at least three processing elements and which includes an allocatable communication connection between processing elements of the system, wherein the signal processing device includes an allocation controller provided with information concerning mapping of processes on the system of processing elements, which allocation controller allocates, in response to a start of production of the data token and under the control of the information on the mapping concerning the process identification in the data token, the communication connection for transmission of the data token from the first processing element to an input of the second processing element if the communication connection has not been allocated for the transmission of another data token to said input of the second processing element.

3. A signal processing device as claimed in claim 2, wherein the first processing element is provided with a processing unit and an output FIFO (First-In First-Out) between the processing unit and the communication connection, the processing unit executing the first process, producing the data items and successively writing these items in the output FIFO, the data items being successively read from the output FIFO for transmission via the communication connection if the allocation controller has allocated the communication connection for transmission of the data token.

4. A signal processing device as claimed in claim 3, wherein the output FIFO has a "FIFO full" output which is coupled to the processing unit in order to suspend the execution of the first process if the output FIFO is full.

5. A signal processing device as claimed in claim 4, wherein the second processing element is provided with a processing unit and an input FIFO between the processing unit and the input of the processing element, the data items being successively written from the first processing element, via the communication connection, into the input FIFO and the processing unit successively reading the data items from the FIFO for processing according to the second process, the allocation controller being arranged to allocate the communication connection to the second processing element for the transmission of the data token in response to the detection that a last data item of a preceding data token has been written into the input FIFO.

6. A signal processing device as claimed in claim 5, wherein the second processing element has a further input which is connected to the communication connection in order to receive a further data token, the second process processing data items from the data token and the further data token in combination, the allocation controller allocating the communication connection for the transmission of the data token only if a start of production of the data token as well as a start of production of the further data token has been detected by the allocation controller.

7. A signal processing device as claimed in claim 4, wherein the signal processing device includes:
    sequence programming means for programming a process sequence of a number of programmably selected processes; and
    sequencing means for imposing a restriction as regards a transmission sequence in which the processes transmit data tokens via the communication connection in conformity with the process sequence of processes programmed in the sequence programming means.

8. A signal processing device as claimed in claim 4, wherein the second processing element has a further input which is connected to the communication connection in order to receive a further data token, the second process processing data items from the data token and the further data token in combination, the allocation controller allocating the communication connection for the transmission of the data token only if a start of the production of the data token as well as a start of the production of the further data token has been detected by the allocation controller.

9. A signal processing device as claimed in claim 3, wherein the second processing element is provided with a processing unit and an input FIFO between the processing unit and the input of the processing element, the data items being successively written from the first processing element, via the communication connection, into the input FIFO and the processing unit successively reading the data items from the FIFO for processing according to the second process, the allocation controller being arranged to allocate the communication connection to the second processing element for the transmission of the data token in response to the detection that a last data item of a preceding data token has been written into the input FIFO.

10. A signal processing device as claimed in claim 9, wherein the second processing element has a further input which is connected to the communication connection in order to receive a further data token, the second process processing data items from the data token and the further data token in combination, the allocation controller allocating the communication connection for the transmission of the data token only if a start of production of the data token as well as a start of production of the further data token has been detected by the allocation controller.

11. A signal processing device as claimed in claim 3, wherein the signal processing device includes:
    sequence programming means for programming a process sequence of a number of programmably selected processes; and
    sequencing means for imposing a restriction as regards a transmission sequence in which the processes transmit data tokens via the communication connection in conformity with the process sequence of processes programmed in the sequence programming means.

12. A signal processing device as claimed in claim 3, wherein the second processing element has a further input which is connected to the communication connection in order to receive a further data token, the second process processing data items from the data token and the further data token in combination, the allocation controller allocating the communication connection for the transmission of the data token only if a start of production of the data token as well as a start of production of the further data token has been detected by the allocation controller.

13. A signal processing device as claimed in claim 2, wherein the second processing element is provided with a processing unit and an input FIFO between the processing unit and the input of the second processing element, the data items being successively written from the first processing element, via the communication connection, into the input FIFO and the processing unit successively reading the data items from the FIFO for processing according to the second process, the allocation controller being arranged to allocate the communication connection to the second processing element for the transmission of the data token in response to detecting that a last data item of a preceding data token has been written into the input FIFO.

14. A signal processing device as claimed in claim 13, characterized in that the signal processing device includes:
    sequence programming means for programming a process sequence of a number of programmably selected processes; and
    sequencing means for imposing a restriction as regards a transmission sequence in which the processes transmit data tokens via the communication connection in conformity with the process sequence of processes programmed in the sequence programming means.

15. A signal processing device as claimed in claim 13, wherein the second processing element has a further input which is connected to the communication connection in order to receive a further data token, the second process processing data items from the data token and the further data token in combination, the allocation controller allocating the communication connection for the transmission of the data token only if a start of production of the data token as well as a start of production of the further data token has been detected by the allocation controller.

16. A signal processing device as claimed in claim 2, wherein the signal processing device includes:

sequence programming means for programming a process sequence of a number of programmably selected processes;

sequencing means for imposing a restriction as regards a transmission sequence in which the processes and transmit data tokens via the communication connection in conformity with the process sequence of processes programmed in the sequence programming means.

17. A signal processing device as claimed in claim 16, wherein the sequence programming means are coupled to the allocation controller in order to block the allocation of the connection for the transmission of the data token for as long as the second process is not yet due in conformity with the process sequence.

18. A signal processing device as claimed in claim 17, in which the second processing element has a further input, the second process being mapped on the second processing element, together with a third process, the second process receiving data from the first process and a fourth process via the input and the further input, respectively, the second process receiving data from a fifth and a sixth process via the input and the further input, respectively, the sequence programming means being programmed so that a sequence in which data tokens of the first and the fifth process are transmitted, via the communication connection, to the first and the second process, respectively, corresponds to a sequence in which data of the fourth and the sixth process are transmitted, via the communication connection, to the first and the second process, respectively.

19. A signal processing device as claimed in claim 16, in which the second processing element has a further input, the second process being mapped on the second processing element, together with a third process, the second process receiving data from the first process and a fourth process via the input and the further input, respectively, the second process receiving data from a fifth and a sixth process via the input and the further input, respectively, the sequence programming means being programmed so that a sequence in which data tokens of the first and the fifth process are transmitted, via the communication connection, to the first and the second process, respectively, corresponds to a sequence in which data of the fourth and the sixth process are transmitted, via the communication connection, to the first and the second process, respectively.

20. A signal processing device as claimed in claim 2, wherein the second processing element has a further input which is connected to the communication connection in order to receive a further data token, the second process processing data items from the data token and the further data token in combination, the allocation controller allocating the communication connection for the transmission of the data token only if a start of production of the data token as well as a start of production of the further data token has been detected by the allocation controller.

* * * * *